July 1, 1924.
A. M. ELGIN
SIFTER
Filed Oct. 27, 1922
2 Sheets-Sheet 1
1,500,062
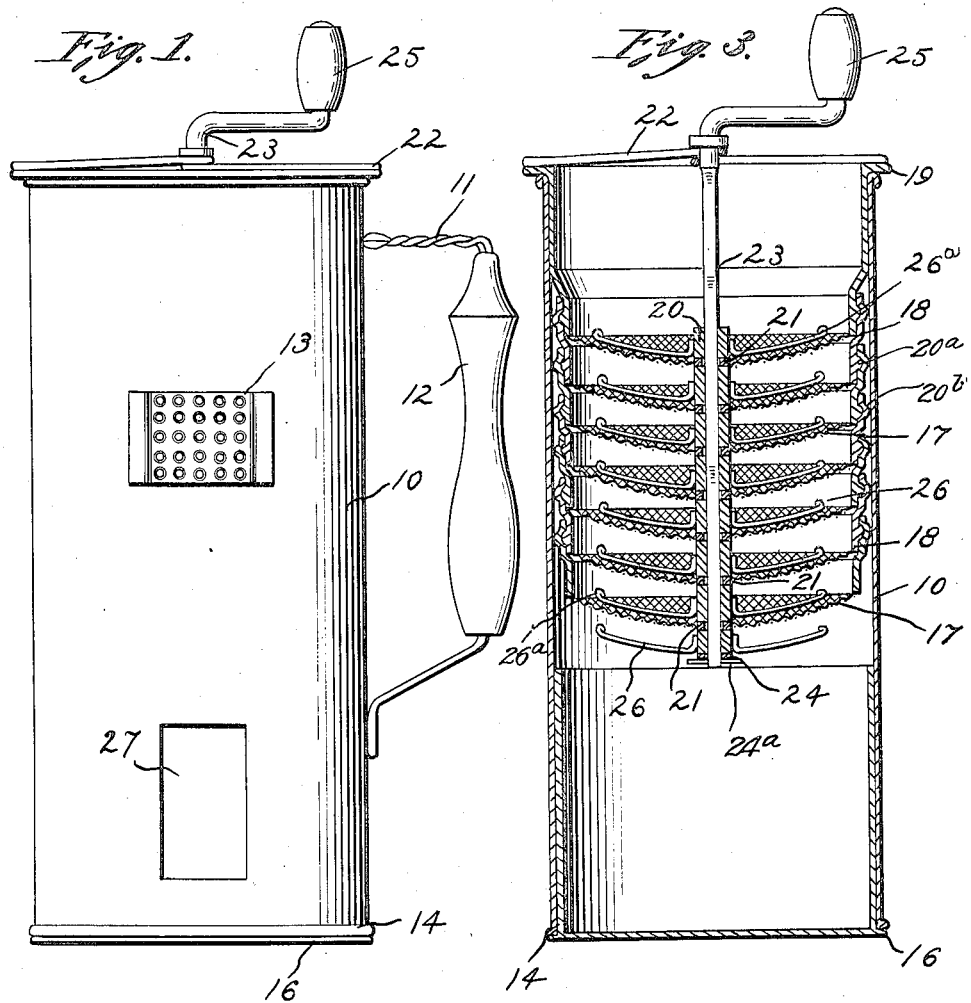
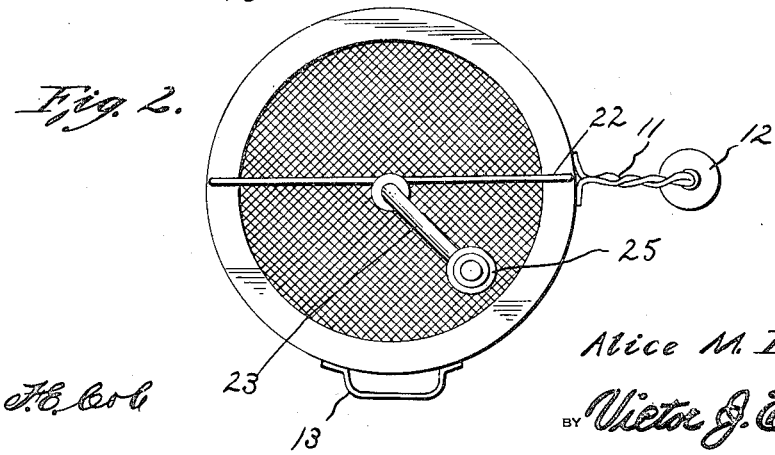
Alice M. Elgin
INVENTOR
BY Victor J. Evans
ATTORNEY

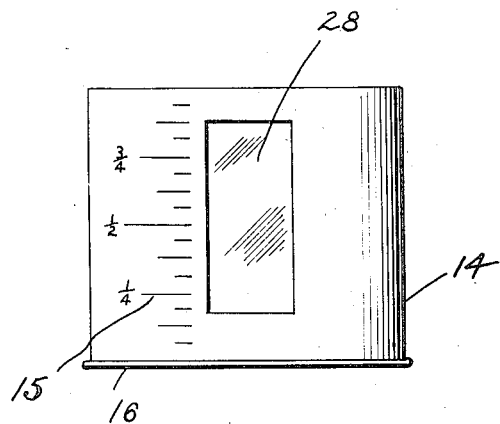
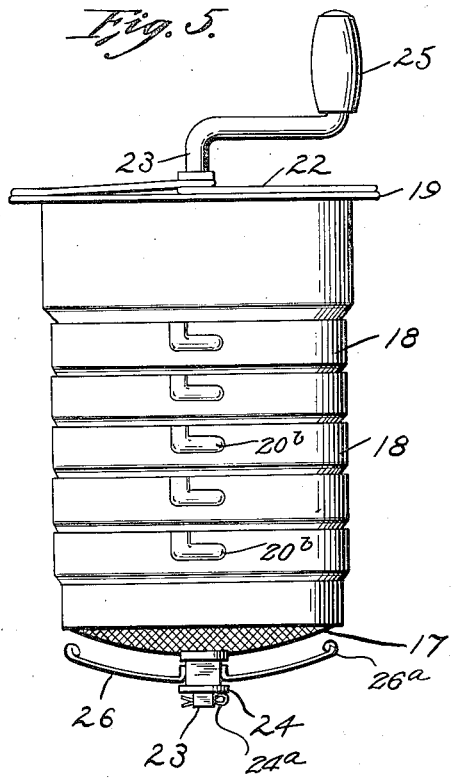
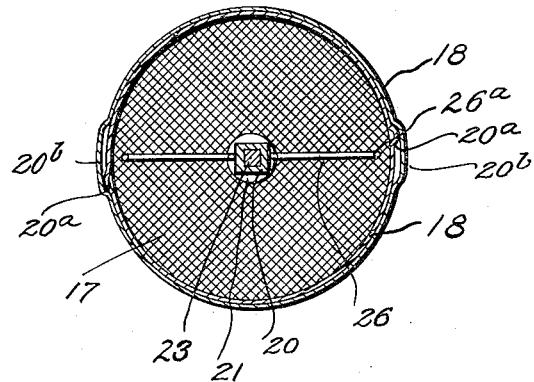

Patented July 1, 1924.

1,500,062

UNITED STATES PATENT OFFICE.

ALICE M. ELGIN, OF CABOOL, MISSOURI.

SIFTER.

Application filed October 27, 1922. Serial No. 597,357.

*To all whom it may concern:*

Be it known that I, ALICE M. ELGIN, a citizen of the United States, residing at Cabool, in the county of Texas and State of Missouri, have invented new and useful Improvements in Sifters, of which the following is a specification.

This invention relates to kitchen apparatus and has for its object the provision of a novel flour sifter which has several other features combined therewith whereby it will have the maximum utility.

An important and more specific object is the provision of a combined flour sifter, measuring cup, nutmeg grater and spoon holder, all combined in one unitary structure, the measuring cup being located in position to receive the flour sifted so that a definite quantity may be sifted easily.

Another object is the provision of a sifter of this character which is provided with a plurality of sifting screens arranged in series and each provided with a rubbing arm, the screens being detachably connected.

An additional object is the provision of a device of this character which will be simple and inexpensive in manufacture, easy and rapid in operation, efficient and durable in service and a general improvement in the art.

With the above and other objects and advantages in view the invention consists in the details of construction to be hereinafter more fully described and claimed and illustrated in the accompanying drawings, in which:

Figure 1 is a side elevation of my complete device,

Figure 2 is a plan view,

Figure 3 is a longitudinal section,

Figure 4 is a side elevation of the measuring cup removed,

Figure 5 is a side elevation of the series of screens removed from the outer container, and Figure 6 is a cross section therethrough.

Referring more particularly to the drawings I have shown my device as comprising a cylindrical outer container 10 which may be constructed of tin or any other suitable material and which has both ends open. At one side this container is provided with a wire handle 11 carrying a wooden grip 12. At another point on one side the container is provided with an offset bracket 13 which is perforated and burred to constitute a nutmeg grater. This bracket may also be used for holding a spoon, the spoon handle being inserted down through the bracket.

Telescopically engaged within one end of the container is a cylindrical cup 14 which forms the bottom and which is provided with graduations indicated at 15 so that it may be used for measuring any desired quantity of flour sifted by the mechanism to be described. The lower edge of the cup is formed with a flange or bead 16 which may be grasped when it is desired to remove the cup from the container.

Detachably slidably engaged within the upper portion of the container is the sifting structure which consists of a plurality of partially-spherical screens 17 arranged in series as shown, and spaced from one another. All these screen members include solid metallic rims 18 and the uppermost rim is formed with an outwardly extending flange 19 seating upon the upper edge of the outer container 10. Each rim, except the lowermost, is provided with a lug $20^a$ engaged within a bayonet slot $20^b$ in the rim next below whereby all the screens are detachably connected. The screens are soldered at their outer edges to the rims 18.

At its center each screen is provided with a ring 21 to which it is soldered, and disposed between the successive screen elements are hubs 20. Secured across the uppermost screen is a spider 22. Journaled through the spider and extending through all the hubs and washers is a shaft 23 having its lower end provided with a washer 24 which is located below the lowermost screen and against which engages a cotter pin $24^a$ which operates to prevent the shaft from being withdrawn from the assembled screen members. The upper end of this shaft projects beyond the container 10 and is formed as a crank and provided with a handle 25. Throughout the major portion of its length the shaft is square in cross section and the hubs fitting thereon having square openings so as to rotate with the shaft. The rings 21 have openings of sufficient size to permit rotation of the shaft.

Secured upon the hubs 20 between the successive screen members are rubbing arms each formed from a single length of resilient metal strip or wire 26 suitably secured to the shaft and curved to conformingly engage against the inside of the screen, the free ends of the arms being rolled as shown at $26^c$.

If desired the outer container 10 might be provided with an opening 27 registering with a celluloid covered opening 28 in the measuring cup so that the user may ascertain the quantity of sifted flour within the measuring cup without drawing it from the container 10.

In the use of the device it will be seen that flour to be sifted is poured into the uppermost screen member and the handle 25 is turned to rotate the shaft 23 so that the rubbing arms 26 will operate to break up the flour in case it is lumpy and rub it through the screens so that by the time the flour passes through the series of screens it will be in perfect condition for baking purposes. The measuring cup is of course removed when the desired quantity of flour is therein, as may be ascertained by looking through the openings 27 and 28, and the flour is then dumped out. The function of the nutmeg grater and spoon holder have already been explained.

From the foregoing description and a study of the drawings it will be apparent that I have thus provided a simply constructed and consequently inexpensive kitchen utensil which will be of manifest advantage as embodying in one device several features of utility in addition to its general function of operating as a most efficient flour sifter.

While I have shown and described the preferred embodiment of the invention it is of course to be understood that I reserve the right to make such changes in the form, construction and arrangement of parts as will not depart from the spirit of the invention or the scope of the subjoined claims.

Having thus described my invention I claim:

1. In a flour sifter, an outer receptacle, a shell detachaby fitting within one end of the receptacle and having its lower end reduced, a series of detachably telescopically engaged rim members provided with wire screen, rings at the centers of the screens one end of said series being detachably connected upon the reduced end of the shell, a shaft journaled axially of the receptacle and through the rings, a plurality of hubs slidably and non-rotatably mounted upon the shaft between and bearing against the successive center rings, and outwardly extending arms carried by each hub and bearing upon the adjacent screen.

2. In a flour sifter, an outer receptacle, a shell detachably fitting within one end of the receptacle and having its lower end reduced, a series of detachably telescopically engaged rim members provided with wire screen, rings at the centers of the screens one end of said series being detachably connected upon the reduced end of the shell, a shaft journaled axially of the receptacle and through the rings, a plurality of hubs slidably and non-rotatably mounted upon the shaft between and bearing against the successive center rings, and outwardly extending arms carried by each hub and bearing upon the adjacent screen, said arms being formed of resilient wire bearing frictionally upon the screens and having their outer ends upturned.

3. In a flour sifter, an outer receptacle, a shell detachably fitting within one end of the receptacle and having its lower end reduced, a series of detachably telescopically engaged rim members provided with wire screen, rings at the centers of the screens one end of said series being detachably connected upon the reduced end of the shell, a shaft journaled axially of the receptacle and through the rings, a plurality of hubs slidably and non-rotatably mounted upon the shaft between and bearing against the successive center rings, and outwardly extending arms carried by each hub and bearing upon the adjacent screen, said arms being formed of resilient wire bearing frictionally upon the screens and having their outer ends upturned, any desired number of the screen members being usable by removing the remainder, and the hubs being likewise removable.

In testimony whereof I affix my signature.

ALICE M. ELGIN.